(12) United States Patent
Elzur (10) Patent No.: US 8,776,090 B2
(45) Date of Patent: Jul. 8, 2014

(54) METHOD AND SYSTEM FOR NETWORK ABSTRACTION AND VIRTUALIZATION FOR A SINGLE OPERATING SYSTEM (OS)

(75) Inventor: Uri Elzur, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 572 days.

(21) Appl. No.: 12/707,480

(22) Filed: Feb. 17, 2010

(65) Prior Publication Data

US 2010/0211946 A1 Aug. 19, 2010

Related U.S. Application Data

(60) Provisional application No. 61/153,261, filed on Feb. 17, 2009, provisional application No. 61/158,095, filed on Mar. 6, 2009.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/324

(58) Field of Classification Search
None
See application file for complete search history.

(56) References Cited

U.S. PATENT DOCUMENTS

| 7,561,571 B1* | 7/2009 | Lovett et al. ................... 370/392 |
| 7,660,306 B1* | 2/2010 | Eiriksson et al. .............. 370/392 |
| 7,843,906 B1* | 11/2010 | Chidambaram et al. ....... 370/386 |
| 7,885,257 B2* | 2/2011 | Droux et al. ................... 370/389 |
| 7,962,545 B2* | 6/2011 | Knauerhase et al. .......... 709/203 |
| 7,962,647 B2* | 6/2011 | Suri et al. ....................... 709/238 |
| 8,176,168 B1* | 5/2012 | Ramamurthy ................ 709/224 |
| 2009/0150521 A1* | 6/2009 | Tripathi ......................... 709/220 |

* cited by examiner

*Primary Examiner* — H S Sough
*Assistant Examiner* — William C Wood
(74) *Attorney, Agent, or Firm* — Oblon, Spivak, McClelland, Maier & Neustadt, L.L.P.

(57) ABSTRACT

A device may abstract access to hardware resources in the device to a single operating system (OS) running in the device utilizing an abstraction layer and a software partition. The abstraction layer and the software partition may enable virtualizing the hardware resources during interfacing between the single OS and the hardware resources, such that the actual characteristics and/or number of the hardware resources may be abstracted. The abstraction layer may comprise a hypervisor, which may be optimized to support network abstraction based operations. The software partition may enable managing configuration and/or use of the hardware resources via the abstraction layer. The hardware resources may comprise networking resources. Accordingly, operations of a plurality of virtual drivers within the OS corresponding to each of one or more of the plurality of hardware resources may be supported. Data transfers between the OS and the hardware resources may be performed via the software partition.

24 Claims, 6 Drawing Sheets

METHOD AND SYSTEM FOR NETWORK ABSTRACTION AND VIRTUALIZATION FOR A SINGLE OPERATING SYSTEM (OS)

CROSS-REFERENCE TO RELATED APPLICATIONS/INCORPORATION BY REFERENCE

This patent application makes reference to, claims priority to and claims benefit from U.S. Provisional Application Ser. No. 61/153,261 filed on Feb. 17, 2009, and from U.S. Provisional Application Ser. No. 61/158,095 filed on Mar. 6, 2009.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for network abstraction and virtualization for a single operating system (OS).

BACKGROUND OF THE INVENTION

An electronic communication network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. Some networks may utilize only a subset of the 7 OSI layers. For example, the TCP/IP model, or Internet Reference model generally utilizes a 5 layer model, which comprises an application layer, (Layer 7), a transport layer (Layer 4), a network layer (Layer 3), a data link layer (Layer 2) and a physical layer (Layer 1). These five layers can be broken down into a fairly specific set of responsibilities or services, which they provide.

As electronic communication networks become increasingly popular, ways of exchanging data of various types, sizes for a variety of applications and business and consumers alike want faster and faster network access on more and more devices. Furthermore, malicious traffic and/or other security threats also increase with the increased reliance on electronic information. Consequently, communicating the ever increasing amounts of data and number of devices in a network presents many challenges to network and system designers and administrators.

Virtualization is one area that system designers and/or administrators have looked to for improving utilization of servers and network resources. In this regard, in non-virtualized systems, a single machine, for example, a server or a client may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single physical machine may result in an improvement in server efficiency. However, consolidation also removes the level of protection that is provided when the operations are maintained separately. For example, when the operations are consolidated, a crash or failure in a database server may also result in the loss of email services, exchange services, and/or application services.

Virtualization, however, may improve server efficiency. Virtualization may comprise utilizing multiple operating systems running concurrently on the server so that each operating system supports a different server operation or application or service, for example. The multiple operating systems may be referred to as guest operating systems (GOSs) or child partitions. This approach maintains the level of protection provided when server operations are not consolidated under a single operating system while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be utilized to arbitrate access to the server's hardware resources. This software layer may be referred to as a hypervisor or virtual machine (VM) monitor, for example. The hypervisor may enable the multiple GOSs to access the hardware resources in a time-sharing manner and/or in parallel, using such technologies as SR IOV. The software layer may be assisted by a trusted GOS (TGOS), which may also be referred to as a parent partition, or Virtual Machine Kernel (VMK) for instance. Although virtualization is useful in many contexts, it does not address many of the challenges faced by system designers and network administrators, and in-fact, presents many new challenges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for network abstraction and virtualization for a single operating system (OS), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for network abstraction and virtualization for a single operating system (OS). In various embodiments of the invention, a device may be operable to abstract access to plurality of hardware resources within the device by a single operating system (OS) running in the device, utilizing an abstraction layer and a software partition. In this regard, use of the abstraction layer and the software partition may enable virtualization of the plurality of hardware resources during interfacing between the single OS and the plurality of hardware resources. The abstraction layer and/or the software partition may operate independently of a plurality of drivers that may be utilized in the single OS during direct and/or indirect communications with the plurality of hardware resources.

The abstraction layer and/or the software partition may enable abstracting physical characteristics of the hardware resources, including actual number and/or capabilities of each of the hardware resources. The abstraction layer may comprise a hypervisor, which may be optimized to support network abstraction based operations. The software partition may enable managing and/or configuring use of and/or access to the hardware resources by the single OS via the abstraction layer utilizing, for example, virtualization based techniques. The hardware resources may comprise networking resources. The software partition may support, during management of access to the hardware resources, use and/or operations of the plurality of drivers within the single OS, which may correspond to one or more of the plurality of hardware resources. In this regard, the plurality of drivers may comprise, for example, a plurality of virtual network interface controller (vNIC) drivers that may correspond to a single physical NIC. Accordingly, the software partition may enable managing allocation of network access capabilities of the single physical NIC among the plurality of vNIC drivers, wherein the network access capabilities comprise network access, software API for controlling the physical NIC, bandwidth and/or quality of service (QoS). In this regard, use of the software partition and/or the abstraction layer may enable variably allocating the total network access capabilities of the single physical NIC among the plurality of vNIC drivers. The software partition may support configuring communication and/or data transfers between the operating system and the hardware resources during use of the plurality of hardware resources via the software partition and/or the abstraction layer. Data transfers between the OS and the hardware resources may be performed directly between plurality of drivers and the abstraction layer; or indirectly via the software partition. At least some of functionality of the abstraction layer and/or the software partition that is used during full virtualization of the device may be disabled when only the single operating system is running in the device. In this regard, the full virtualization may comprise supporting running a plurality of virtual machines (VMs) in the device.

Figure 1A:
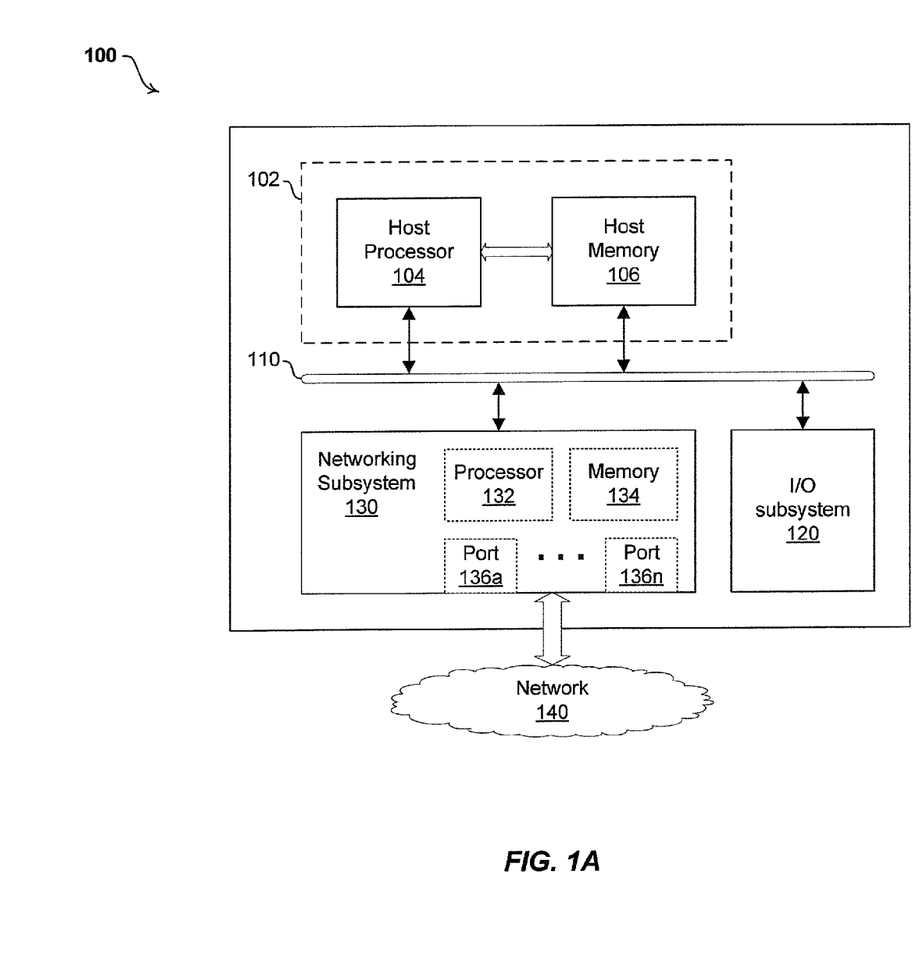
FIG. 1A is a block diagram illustrating an exemplary system that may provide networking access, which may be utilized in accordance with an embodiment of the invention.

FIG. 1A is a block diagram illustrating an exemplary system that may provide networking access, which may be utilized in accordance with an embodiment of the invention. Referring to FIG. 1A, there is shown a network device 100, a host subsystem 102, a host processor 104, a host memory 106, a system bus 110, an input/output (I/O) subsystem 120, a networking subsystem 130, an optional networking processor 132, an optional networking memory 134, a plurality of ports 136a, . . . , 136n, and a network 140.

The network device 100 may comprise suitable logic, circuitry, interfaces, and/or code that may enable performing various tasks and/or applications based on, for example, user input. Exemplary network devices may comprise a server, a personal computer (PC), a laptop, a smart phone, and/or handheld mobile device. The network device 100 may comprise, for example, the host subsystem 102, the system bus 110, the I/O subsystem 120, and/or the networking subsystem 130. In this regard, the host subsystem 102 may provide control and/or management of the operations of the network device 100, and/or the I/O subsystem 120 may enable user interactions with the network device 100. Furthermore, the network device 100 may utilize network access, via the networking subsystem 130 for example, to facilitate communication of data and/or information from and/or to the network device 100 during performance of tasks and/or applications. The network device 100 may also comprise other hardware resources (not shown) such as a graphics card and/or a peripheral sound card, for example.

The host subsystem 102 may comprise suitable logic, circuitry, interfaces, and/or code that may enable controlling and/or managing operations of the network device 100, and/or tasks and/or applications performed therein. The host subsystem may comprise, for example, the host processor 104 and/or the host memory 106. The host processor 104 may comprise suitable logic, circuitry, interfaces and/or code that may be operable to process data and/or control operations of the network device 100. In this regard, the host processor 104 may be operable to configure and/or control operations of various other components and/or subsystems of the network device 100, by utilizing, for example, one or more control signals. The host processor 104 may also control data transfers within the network device 100, during networking operations for example. The host processor 104 may enable execution of applications, programs and/or code, which may be stored in the host memory 106 for example, to enable execution of various network processing operations. The host memory 106 may comprise suitable logic, circuitry, interfaces and/or code that enable permanent and/or non-permanent storage and/or fetch of data, code and/or other information used in the network device 100. In this regard, the host memory 106 may comprise different memory technologies, including, for example, read-only memory (ROM), random access memory (RAM), and/or Flash memory. The host memory 106 may operable to store, for example, information comprising configuration data used during network processing operations in the network device 100. The configuration data may comprise parameters and/or code, which may comprise software and/or firmware, but the configuration data need not be limited in this regard.

The system bus 110 may comprise suitable logic, circuitry, interfaces, and/or code that may enable exchange of data and/or information between various components and/or subsystems in the network device 100. In this regard, the system bus may comprise different parallel or serial, and/or internal or external, based bus technologies, and/or any combinations thereof, including, for example, Inter-Integrated Circuit (I²C), Universal Serial Bus (USB), Advanced Technology Attachment (ATA), Small Computer System Interface (SCSI), Peripheral Component Interconnect (PCI), and/or Peripheral Component Interconnect Express (PCI-e) interfaces.

The networking subsystem 130 may comprise suitable logic, circuitry, interfaces, and/or code that may enable network access for example, to communicate data and/or information from and/or to the network device 100. The network subsystem 130 may comprise, for example, a network interface controller or chip (NIC). The networking subsystem 130 may comprise, for example, the networking processor 132, the networking memory 134, and/or the plurality of ports 136a, . . . , 136n. The networking subsystem 130 may support, for example, physical (PHY) layer accessibility, via the plurality of ports 136a, . . . , 136n, and/or level 2 (L2) switching to facilitate communication of data from and/or other subsystems in a host system. The switching supported by the networking subsystem 130 need not be limited to L2 only, and may be any combination of L2, L3, L4, VLAN, and/or any other higher and/or additional protocol layer. Accordingly, the networking subsystem 130 may enable communication of data with one or more networks, such as the network 140, and may enable basic L2 switching, VLAN based switching, TCP offload, iSCSI, FCoE, and/or RDMA operations, for example. The networking processor 132 may comprise suitable logic, circuitry, interfaces, and/or code that may enable control and/or management of processing and/or networking operations in the networking subsystem 130. The networking memory 134 may comprise suitable logic, circuitry, and/or code that may enable dedicated storage of data utilized by the networking subsystem 130. The networking memory 134 may comprise one or more ROM and/or RAM memory devices.

The network 140 may comprise a system of interconnected networks that may enable exchange of data and/or information among a plurality of nodes, based on one or more networking standards, such as TCP/IP. The network 140 may comprise a plurality of broadband capable subnetworks, which may comprise, for example, satellite networks, cable networks, DVB networks, the Internet, and/or other local or wide area network. These subnetworks may collectively enable conveying data, via Ethernet packets for example, to plurality of end users.

Figure 1B:
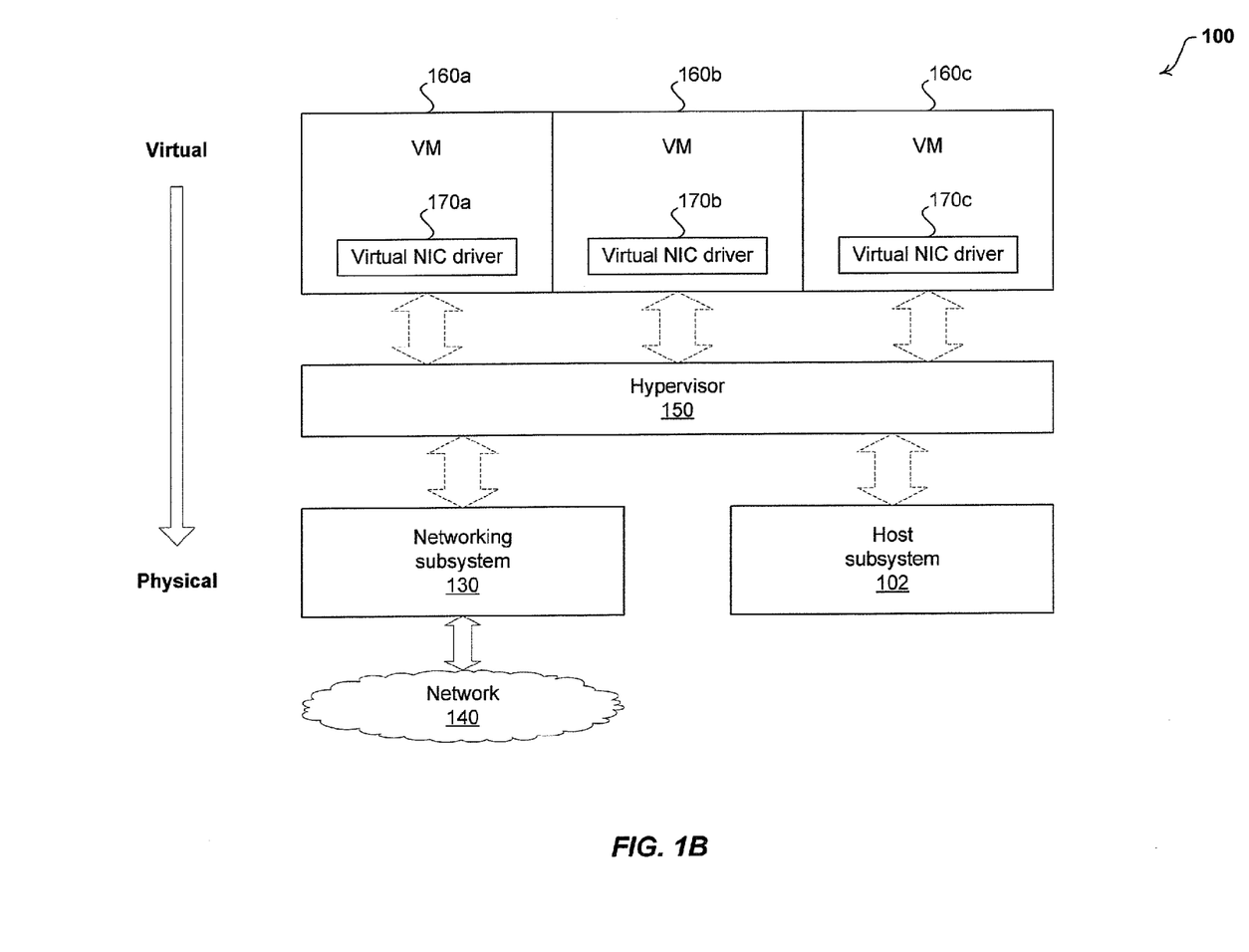
FIG. 1B is a block diagram illustrating a virtual machine implementation within a system, which may be utilized in accordance with an embodiment of the invention.

FIG. 1B is a block diagram illustrating a virtual machine implementation within a system, which may be utilized in accordance with an embodiment of the invention. Referring to FIG. 1B, there is shown the host subsystem 102 and the networking subsystem 130 of the network device 100 in FIG. 1A. Also shown in FIG. 1B is a hypervisor 150, a plurality of virtual machines (VMs) 160a, 160b, and 160c, and a plurality of virtual Network Interface Controller (NIC) drivers 170a, 170b, and 170c.

Each of the virtual machines (VMs) 160a, 160b, and 16b may comprise a software implementation that may execute and/or perform programs and/or applications that are typically executed and/or performed by physical machines, such as a computer. For example, each of the VMs 160a, 160b, and 160c may correspond to an operating system (OS), for example, which may enable running and/or execution of operations or services such as software applications, email server operations, database server operations, and/or exchange server operations, for example. Each of the virtual NIC drivers 170a, 170b, and 170c may comprise a dedicated software component within each of the VMs 160a, 160b, and 160c, respectively, which is operable to handle interactions between the respective VM and the network subsystem 130, with or without the assistance of the hypervisor. The number of VMs that may be supported by the host subsystem 102 need not be limited to any specific number. For example, one or more VMs may be supported by the host subsystem 102. In this regard, operations and/or use of the host processor 104 may be partitioned utilizing, for example, time division multiplexing to enable supporting each of existing VMs. For example, each VM supported by the host subsystem 102 may have a corresponding timeslot during which the host processor 104 performs operations for that VM. Moreover, the hypervisor 150 may have a corresponding timeslot. Similarly, the host memory 106 may be partitioned into a plurality of memory portions, to enable supporting each of existing VMs. In this regard, each VM supported by the host subsystem 102 may have a corresponding memory portion in the host memory 106. Moreover, the hypervisor 150 may also have a corresponding memory portion in the host memory 106.

The hypervisor 150 may comprise suitable logic, code, interfaces, and/or circuitry that may be utilized in a virtualized environment to support, for example, multiple virtual machines that may run concurrently on a single platform. In this regard, the hypervisor 150 may correspond to physical and/or virtual components of the host subsystem 102, and/or other entities and/or subsystems within the network device 100. The hypervisor 150 may operate as a software layer that may run directly on top of hardware resources to enable virtualization of the hardware and/or physical resources of the network device 100.

In instances where the network device 100 is operated as a virtualized platform, the networking subsystem 130 may be referred to as virtualization-aware because communication with each VM may occur by an independent set of resources including for instance, separate queues. In this regard, the networking subsystem 130 may determine the right address or combination of address information, such as, for example, MAC address, VLAN address, MAC address AND VLAN address, L3 address, L4 address, L4 port, among others, to be used in order to select the right target VM. For example, the networking subsystem 130 may determine, via the networking processor 132 for example, the MAC address of received packets and may transfer the received packets to an RX queue that corresponds to the VM with the appropriate address as described above. Similarly, the networking subsystem 130 may enable transfer of packets from the VMs to the network by coordinating and/or arbitrating the order in which packets posted for transmission in TX queues may be transmitted. In this regard, when the queues are exposed to the VM on one side and to the networking subsystem 130 on the other side, the networking subsystem 130 is said to enable direct input/output (I/O) or hypervisor bypass operations. However communications of data frames through the hypervisor is possible as well.

The networking subsystem 130 may also allow performing, via the networking processor 132 or dedicated hardware for example, of additional operations such as validation, correction, and/or generation of, for example, MAC addresses, VLAN tags, IP addresses, and/or attributes such as TOS bits. For example, the networking subsystem 130 may detect that a VM may request a packet to be sent with a wrong source MAC address. The networking subsystem 130 may validate a source MAC address by, for example, comparing the source MAC address for a packet with MAC addresses that may be associated with specific VM or buffers, and/or packet types. The networking subsystem 130 may be shared by the plurality of VMs 160a, 160b, and 160c. In some instances, network protocol operations may be offloaded to the networking subsystem 130 and handled by the networking subsystem 130. The offloaded network protocol operations may comprise, for example, OSI layer 3, 4, and/or 5 protocol operations, such as, for example, TCP and/or IP operations. The networking processor 132 may also execute link layer network protocol operations, which may be, for example, OSI layer 2 protocol operations, for example, a VLAN.

In operation, the network device 100 may be as a virtualized platform. In this regard, the hypervisor 150 and the plurality of VMs 160a, 160b, and 160c may be utilized to support platform virtualization based operations within the network device 100. For example, the host subsystem 102 may support the operations of each of the VMs 160a, 160b, and 160c, via the hypervisor 150, as separate and/or distinct operating system. In this regard, the hypervisor 150 may allocate hardware resources and may also enable data communication between the VMs and hardware resources in the network device 100. For example, the hypervisor 150 may enable data communication between one or more of the VMs 160a, 160b, and/or 160c by controlling the transfer of data between portions of the host memory 106 that corresponds to each of VMs. The hypervisor 150 may employ various techniques and/or mechanisms to provide isolation between the VMs running within the network device 100, such as VMs 160a, 160b, and 160c, to prevent undesirable interactions between the VMs, such as malicious or buggy affects by operations with a VM on the functionality, performance and/or stability of the hardware and/or software in the network device 100 that may be utilizing by remaining VMs. Exemplary techniques may comprise use of double accounting of memory page tables, which may be used during memory access (e.g. shadow page table. In this regard, these techniques may be implemented by software and/or hardware; indirect virtual machine I/O access to hardware; trapping of privileged operations and I/O, or memory-mapped I/O (MMIO). Also, context switches may be implemented between the virtual machine space to hypervisor space, or in some cases to another privileged space used for IO as well, such as, for example, kernel virtual machine (KVM); and/or input/output memory management unit (IOMMU).

The networking subsystem 130 may provide the VMs 160a, 160b, and/or 160c with network accessibility, to the network 140 for example. In this regard, the hypervisor 150 may facilitate network access by the VMs 160a, 160b, and/or 160c via the networking subsystem 130. For example, the hypervisor 150 may enable data transfer between the VMs 160a, 160b, and 160c, and the networking subsystem 130 to facilitate network communication to and/or from the network 140. In this regard, in instances where a VM, such as VM 160a, is engaged in network transmission and/or reception, data may travel between a port in the networking subsystem 130, such as port 136a, and the VM 160a after the hypervisor 150 has allocated queues and/or other physical resources. During network access operations, virtual NIC drivers 170a, 170b, and 170c may run with each of the VMs 160a, 160b, and 160c, respectively, to handle necessary processing operations within each VM during communication, of data and/or control messaging, with the network subsystem 130. In this regard, the networking subsystem 130 may also support level 2 (L2) switching, and/or higher layer of switching, for communication between virtual machines (VMs) in a host system. The switching supported by the networking subsystem 130 need not be limited to L2 only, and may be any combination of L2, VLAN, L3, L4, higher protocol layer and/or additional information including from the administrator as to how to perform the switching.

In an exemplary aspect of the invention, the network device 100 may be configured to support network abstraction and/or to enable use of virtualization based techniques when a single operating system (OS) is running in the network device 100. In this regard, normally multiple physical devices may be needed in order to present to a single OS multiple devices operability. Accordingly, the network device 100 may be configured to use, for example, at least some of functionality normally used to support virtualization to enable presenting a single physical device as a plurality of devices to a single OS.

Figure 1C:
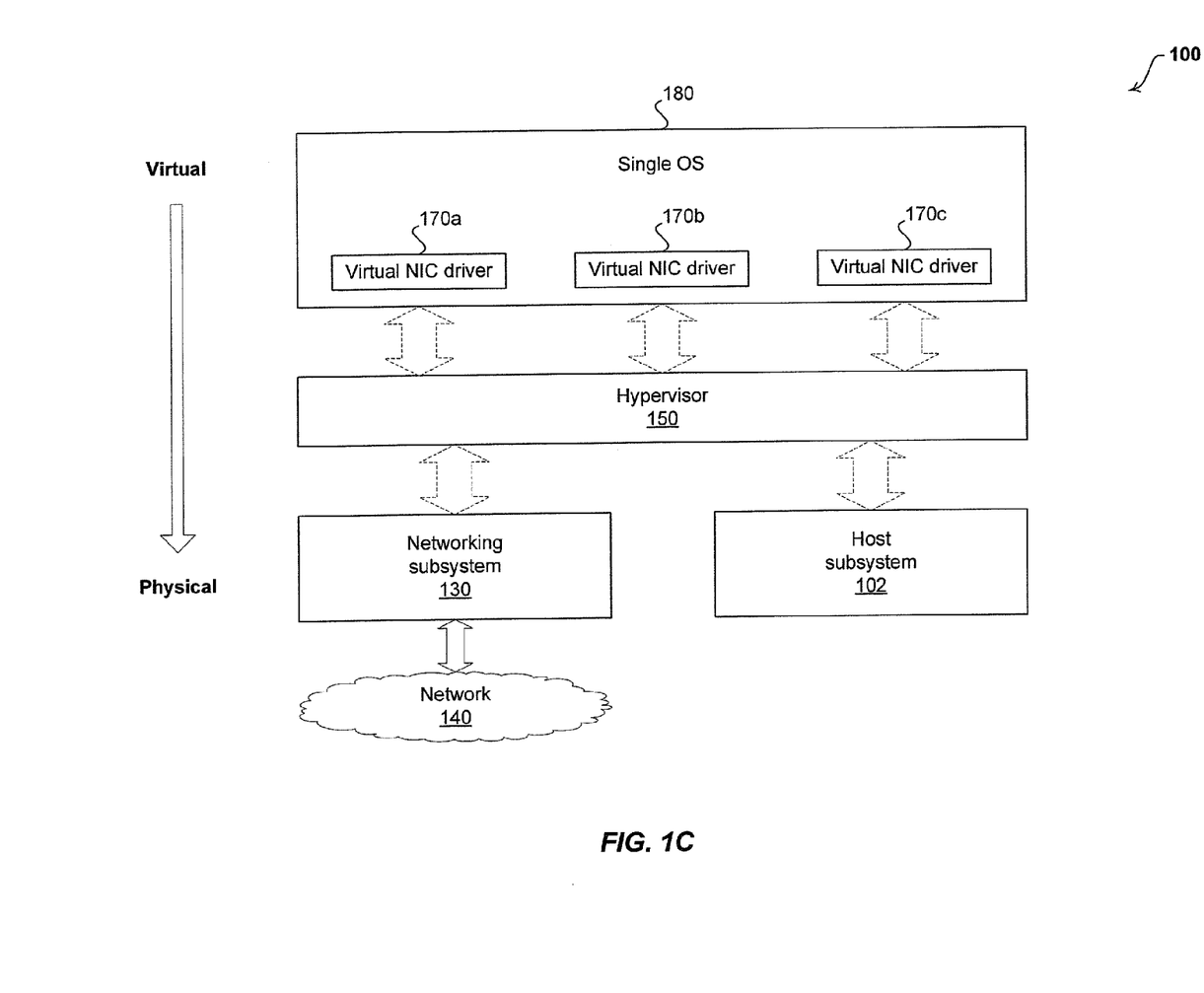
FIG. 1C is a block diagram illustrating a system that enables use of virtualization based techniques to manage use of a physical resources when a single operating system (OS) is running in the system, in accordance with an embodiment of the invention.

FIG. 1C is a block diagram illustrating a system that enables use of virtualization based techniques to manage use of a physical resources when a single operating system (OS) is running in the system, in accordance with an embodiment of the invention. Referring to FIG. 1C, there is shown the host subsystem 102 and the networking subsystem 130 of the network device 100 in FIGS. 1A and 1B; and the hypervisor 150 and the plurality of virtual Network Interface Controller (NIC) drivers 170a, 170b, and 170c of FIG. 1B. Also shown in FIG. 1C in a single operating system (OS) 180.

The OS 180 may be similar to each of the VMs 160a, 160b, and/or 160c, substantially as described with regard to FIG. 1B. In the embodiment described herein, however, the OS 180 would be the only OS running in a system, such as the network device 100. In this regard, the OS 180 may correspond to proprietary and/or open-source operating systems, and may comprise various components that may support specific applications and/or may enable interacting with specific types of hardware resources, such as network interface controllers (NICs). The OS 180 may be operable to enable running and/or execution of various operations or services, in the network device 100, such as, for example, software applications, email server operations, database server operations, and/or exchange server operations, for example.

In operation, the network device 100 may support network abstraction and/or use of virtualization to support and/or optimize operations of the single operating system (OS) 180 running in the network device 100. In this regard, operations of various entities, components and/or subsystems of the network device 100, physical and/or virtual, may be modified, adjusted, configured, and/or optimized to support network abstraction based operations and/or use of virtualization to support the single OS 180 running in the network device 100. Network abstraction may comprise various techniques and/or mechanisms that may optimize interactions between an OS (or a virtual machine—VM) and hardware resources available in a system, such as the network device 100, by abstracting the hardware resources from the OS, utilizing virtualization based operations and/or interfaces for example. Consequently, the OS may continue to use the same access and/or interaction mechanisms even in instances where there may be changes in the hardware resources, whether in number, capabilities, and/or access protocol.

For example, network abstraction may be used to allow running virtual network interface controllers (vNICs), using control and/or communication mechanisms that may be used to directly access and interact with physical NICs, such as PCI based access, regardless of the actual number and/or type of physical NICs in the system. This may be done both in instances where a single OS is running within the system or where multiple OS are sharing the same platform in a virtualization based environment for example. Accordingly, a single OS may run multiple vNICs even in instances where there is a single physical NIC. Network abstraction may also enable partitioning the capabilities of hardware resources among corresponding virtual instances running in the OS. For example, in instances where network abstraction is used to support multiple vNICs in the OS, the capabilities of a corresponding single physical NIC (e.g. 10G/40G NIC) may be partitioned among the multiple vNICs.

In addition, network abstraction may enable managing and/or controlling capabilities of hardware resources external to the OS while abstracting the hardware resources that are being used. For example, in instances where network abstraction based techniques are utilized in conjunction with a single physical NIC, network abstraction may enable controlling allocation of the bandwidth to each vNIC, which may enable providing bandwidth guarantees to specific application or services associated with a given vNIC and/or improving bandwidth utilization, based on vNIC configuration, for example, whereas a single driver may otherwise have exclusive control of the physical NIC even where less than the maximum bandwidth supported by the single NIC may be needed. Furthermore, network abstraction may also enable tailoring network accessibility to the needs of system administrators. For example, network abstraction may be used to define and/or determine number of vNICs allowed, and/or QoS per vNIC, normal NIC functionality that may be exposed, and/or configuration of addressing information (e.g. MAC and/or VLAN) for each vNIC. In instances where network abstraction based techniques are utilized even where a single OS is running, the transition between non-virtualized environment (i.e. single OS) and virtualized environment (i.e. multiple OS) may be seamless. Furthermore, this may allow use of virtualization based features and/or benefits, such as failure-triggered software migrations for example, even in instances where a single OS is running. In addition, because unified mechanism is utilized when the systems are run as virtualized or non-virtualized platform, the overall system management is simplified. While network abstraction has been described with regard to NICs, the invention need not be so limited. For example, network abstraction may be used, generally in similar manner, in conjunction with, for example, storage host bus adapters (HBAs).

To facilitate use of network abstraction by a single OS, such as the OS 180 in the network device 100, a software (SW) partition that is external to the OS may be utilized to abstract at least some of the operations of components and/or entities that are utilized in virtualizing hardware resources, such as the hypervisor 150 in the network device 100. This software partition may correspond to modified hypervisor that specifically support single OS, or may correspond to a separate partition that is external to both the OS and the hypervisor. Accordingly, the mechanisms and/or entities used to abstract hardware resources in virtualized platform based environment may be modified, changed, and/or reconfigured without necessitating corresponding changes at the OS side. In this regard, the independent software partition may run, for example, within the host subsystem 102. For example, in the case of NIC access, the software partition external to the OS may be utilized to present to a single OS, via a software layer sitting on top of the hypervisor 150 for example, with multiple PCI functions representing multiple vNICs, regardless of knowledge of actual number or capabilities of physical NICs available, virtualization techniques used, and/or existence of virtualization altogether. This may also be beneficial because hypervisors must emulate the hardware a VM may expect to run, which may be different from the hardware in the physical system under the hypervisor. Therefore, hypervisors currently available may support virtual PCI configuration space. Thus, non-virtualization aware OS may need the hypervisor to emulate a complete PCI configuration space to support the OS and its NIC driver's access to PCI configuration space.

Furthermore, because certain physical devices, such as PCI devices, which may comprise, for example, a NIC, may only be exposed once to any OS, an OS may not currently be permitted, to run more than one driver corresponding to each physical PCI device and therefore may not be able to support partitioning the device into few entities. Consequently, network abstraction based techniques may be utilized to address some of these issues, by allowing non-virtualized OS to utilize virtualization based configuration space (such PCI based configuration space) to enable supporting configuration plane (of hardware resources) that is external to the OS, which may be then utilized via corresponding virtual drivers with the OS. In this regard, the external configuration may have direct knowledge of the actual characteristics of the hardware resources, including, for example, number and/or physical capabilities for each hardware resource. The external configuration plane may then be utilized to emulate physical resources that are necessary to support operations of the OS virtual drivers. The external configuration plane may also provide additional functionality that enable interactions between the OS virtual drivers and the hardware resources, which may comprise physical hardware queues between hardware and software, interrupt resources, network address configuration and filtering, and/or QoS and bandwidth controls. In addition, the use of network abstraction and/or external software layer utilized for configuration operation may also allow an OS to run multiple virtual instances for each corresponding physical device by exposure to the OS, via the network abstraction layer(s) for example, multiple PCI Virtual Functions (VF) that may be presented to the OS as physical PCI devices, which may be a number larger than those supported by the hardware.

In instances where the network device 100 is utilized to provide network abstraction based servicing to a single OS, some of the operations of various components, entities, and/or subsystems of the network device 100, which may be utilized during virtualization based operations, and especially the hypervisor, may be modified and/or adjusted to support running the single OS in the network device 100 using virtualization based techniques. This contributes to simplification of the hypervisor code used and essentially may significantly reduce it, which in turn makes its maintenance simpler and the memory footprint and profile for attacks much smaller as well as its real time impact on platform performance. For example, since only a single OS is running, a failure of the OS may be deemed as a failure of the machine (network device 100) itself and therefore no protection against other virtual NICs may be required, unlike a virtual NIC in a multi VM virtualized platform. Also, because there are no multiple OS running in the network device 100, some of software modules and/or hardware controls of the hypervisor 150 that utilized during virtualization based servicing may be disabled, simplified, and/or streamlined. For example, because only a single OS is being used in the network device 100, there may not be a need utilize some of the techniques otherwise used by the hypervisor 150 to guard against malicious or buggy interactions between the multiple OS (or VMs). For example, the use of multiple page tables for memory management is common practice for hypervisors. It has a significant performance impact that may be somewhat reduced when supported in the CPU hardware, but is not eliminated. In this regard, since only OS is supported, the network abstraction technology allows use of one shared page table with few pages trapped. Also, For IO, the hardware resources may be exposed directly to the OS drivers, avoiding the typical overhead associated with I/O access when the hypervisor 150 is operated in full virtualization (with multiple VMs) environment. In other words, when a single OS is running in the network device 100, a network abstraction-optimized hypervisor 150 may be required to provide only hardware abstraction (e.g. NIC and/or storage HBA access) and/or to keep only the minimal functionality to allow future additional services, such as being able to revert back and forth between limited, single OS based operations and fully hypervisor operability if the network device transitions back to real/full virtualization (i.e. with multiple VMs/OS).

While some of the functionality of the virtualization-related components, such as the hypervisor 150, may need to be modified to support a single OS running in the network device 100, other functionality may be maintained to provide services that may not otherwise be available to an OS that is directly controlling and/or interacting with hardware resources. For example, in instances when the hardware resources may fail or require service; when additional and/or less hardware resources may be needed for the OS and/or its applications; and/or when the OS, with its applications, is being moved to a different machine that may host the OS along with another OS over a hypervisor, the OS may be migrated to that other machine with no disruption in service provided to its user using VM migration functionality presently available and/or supported in virtualization environment. This kind of a service, which may allow migration of a physical OS, may not be typically available. Rather, it may be only available with deployment of virtualization layer in the fashion described herewith.

Accordingly, network abstraction may provide a unified approach for managing and/or controlling virtualized and non-virtualized (physical) machines. Currently, separate tools, services, and/or functionality may currently be used to configure, provision, manage, control and/or collect statistics with physical OS and virtual machines. Therefore, system users and/or administrators may have to master more tools at a greater expense. Furthermore, resources may not be moved easily between the two types of computing machines (i.e. physical OS based vs. virtual environment). Consequently, utilizing network abstraction based functionality may allow use of common set tools, management, services and/or functionality that may be suitable for both physical and virtual environments. Furthermore, use of network abstraction may enable machines running a single OS to go virtual (i.e., run as a virtual machine in virtualized environment). In this regard, network abstraction based functionality may enable OS migration and/or server consolidation without using special tools to convert the OS to the virtual environment. As more machines are capable of high performance virtualization and more are turned on with virtualization, it is beneficial to deploy OS (and applications running therein) as "virtualization ready." While the invention may have been described with regard to networking resources, the invention need not be so limited. In this regard, substantially similar abstraction based techniques may also be utilized with other types of hardware resources that may be utilized and/or accessed by a single OS running in a machine.

Figure 2A:
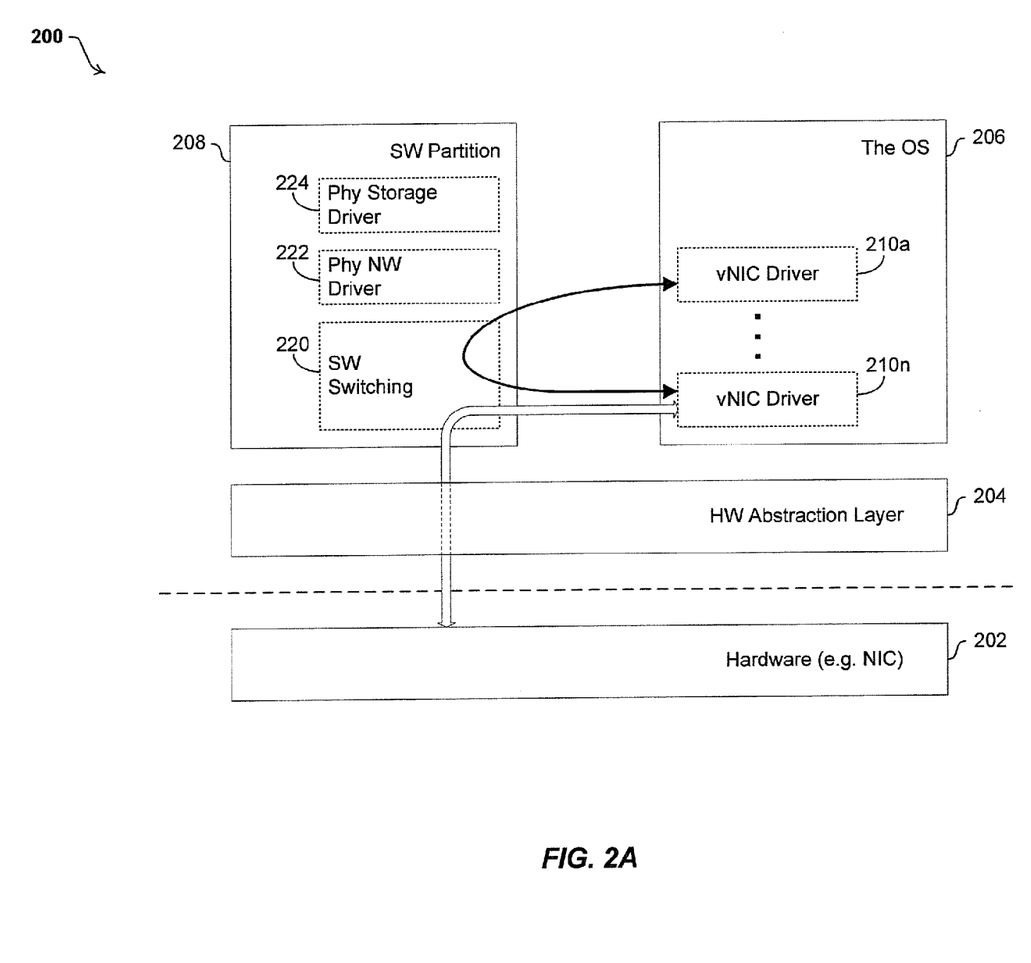
FIG. 2A is a block diagram illustrating an exemplary architecture for supporting hardware abstraction and virtualization for single OS, in accordance with an embodiment of the invention.

FIG. 2A is a block diagram illustrating an exemplary architecture for supporting hardware abstraction and virtualization for single OS, in accordance with an embodiment of the invention. Referring to FIG. 2A, there is shown an exemplary network abstraction based architecture 200, which may be implemented in the network device 100, for example, to support hardware resource abstraction and/or virtualization of single OS. Shown in FIG. 2A, is a hardware resources 202, an abstraction layer 204, an operating system (OS) 206, a software partition 208, a plurality of vNIC drivers 210a, . . . , 210n, a software switching module 220, a physical network driver 222, and a physical storage driver 224.

The hardware resources 202 may correspond to one or more physical components and/or subsystems in the network device 100. In this regard, the hardware resources 202 may comprise a physical NIC, which may correspond to the networking subsystem 130 in the network device 100, and/or an element thereof. The hardware abstraction layer 204 may comprise suitable logic, code, interfaces, and/or circuitry that may enable abstracting corresponding, underlying hardware resources. In this regard, the hardware abstraction layer 204 may comprise physical and/or virtual components of the network device 100 that may be utilized to abstract hardware resources in the network device 100 during network abstraction based interactions with the OS 206. For example, the abstraction layer 204 may comprise the hypervisor 150, which may be optimized for network abstraction operations and/or virtualization of single OS in the network device 100.

The OS 206 may correspond to an operating system that may be running in the network device 100. In this regard, the OS 206 may be run in the host subsystem 102 of the network device 100. The OS 206 may be similar to the single OS 180, substantially as described with regard to FIG. 1C. In this regard, the OS 206 may support, for example, use of NIC drivers to enable interactions with and/or use of physical NICs. In an exemplary aspect of the invention, in instances where the software partition 208 and/or the abstraction layer 204 are utilized to abstract a physical NIC in the hardware resources 202, such that exact number and/or capabilities of the physical NIC in the hardware resources 202 may be abstracted, the OS 206 may be operable to spawn and/or use a plurality of virtual NIC (vNIC) drivers 206a, . . . , 206n. Each of the plurality of vNIC drivers 206a, . . . , 206n may comprise a dedicated software component that is operable to handle NIC interactions within the OS 206 independently of the remaining vNIC drivers.

The software partition 208 may execute and/or perform specific operations to support hardware abstraction and/or virtualization of a single OS in the network device 100. For example, to facilitate abstracting hardware resources 202, the software partition 208 (or one or more of its components) may utilize, for example, existing hypervisor driver architectures, such as, for example, Xen Netchannel for non-PV guests. In this regard, the software partition 208 may be run within the host subsystem 102 of the network device 100, for example. The software partition may comprise a plurality of modules and/or components that may be utilized to provide specific services and/or perform specific tasks during hardware abstraction and/or virtualization of single OS in the network device 100. In this regard, the software partition 208 may comprise, for example, the software switching module 220, the physical network driver 222, and the physical storage driver 224. The physical network driver 222 may be operable to, for example, handle interactions of a physical NIC in the hardware resources 202, via the abstraction layer 204. The physical storage driver 224 may be operable to handle interactions with physical storage components in the network device 100, directly and/or via the abstraction layer 204. The software switching module 220 may be operable to manage routing of messaging and/or data to and/or from the OS 206. In this regard, the software switching module 220 may manage and/or provide data transfers between the OS 206 and the hardware resources, and/or between pairs of the vNIC drivers 206a, ..., 206n in the OS 206.

In operation, the software partition 208 may be operable to abstract physical resources in the network device 100 which may be accessed and/or used by the OS 206, using PCI functions for example. In this regard, the software partition 208 may be utilized to enumerate a specific PCI function and physically control it such that the software partition 208 may be operable to, in conjunction with the abstraction layer 204 for example, abstract the PCI function to enabling presenting the PCI function (or a virtual function—"VF") as multiple PCI functions (or multiple VFs). In other words, the OS 206 may operate as if multiple hardware resources exist when in reality only a single physical resource is available in the network device 100. For example, the physical network driver 222 may be used to implement and/or abstract a PCI function that is used to interact with and/or control a single physical NIC in the hardware resources 202, and/or to abstract that PCI function to enable spawning multiple vNIC drivers 206a, ..., 206n in the OS 206. Each of the vNIC drivers 206a, ..., 206n may operate as if it is communicating with, and/or controlling a different, dedicated physical NIC. Similarly, the physical storage driver 224 may be used to implement and/or abstract the PCI function used to interact with a single physical storage component in the network device 100, and to abstract that PCI function such that OS 206, and/or any applications running therein, may operate as if multiple dedicated storage components available.

In an exemplary aspect of the invention, abstracting hardware resources 202 which are utilized and/or accessed indirectly by the OS 206 via the software partition 208 and/or the abstraction layer 204, may enable improving hardware utility in the network device 100 and/or allow better isolation and/or segmentation of the hardware devices among multiple applications residing on the OS 206, to allow, for example, better control of the bandwidth allocated to each application and/or better control over the networks (and/or VLAN) that each application may be connected with. For example, in instances where the software partition 208 is utilized to facilitate abstracting NIC access, the physical network driver 222 may manage and/or control overall use of the single physical NIC in the hardware resources 202 among the vNIC drivers 206a, ..., 206n. In this regard, the physical network driver 222 may specify networking capabilities allocated for each vNIC driver separately. For example, the physical network driver 222 may control bandwidth allocated to each of the vNIC drivers 206a, ..., 206n during data transfers corresponding to networking access by presenting each virtual instance of the single NIC that is utilized by one of the vNIC drivers 206a, ..., 206n with only a portion of the overall bandwidth available via the single NIC. In this regard, the physical network driver 222 may configure the software switching module 220, for example, specifying data transfer routes (e.g. VLANs), address confirmation information, transfer bitrates, QoS, and/or minimum and/or maximum bandwidth allowed for each vNIC driver in the OS 206 during network access via the hardware resources 202.

The software switching module 220 may also be configured to provide unicast, multicast, and/or broadcast based switching among the vNIC drivers 206a, ..., 206n. This may require a modification and/or reconfiguration of hypervisors functionality supporting software based switching in instances where this functionality may be only configured for inter-VM switching, and may not support inter-NIC switching for the same VM (or in this case OS).

Figure 2B:
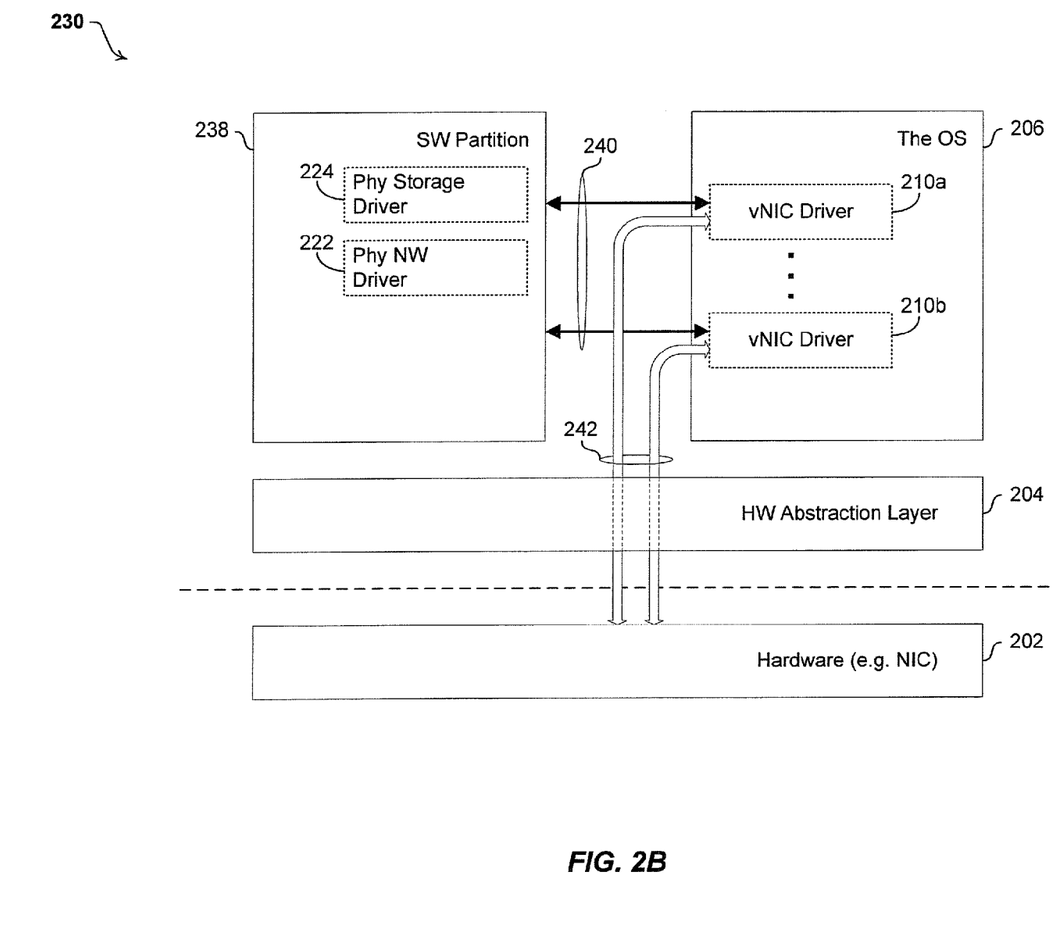
FIG. 2B is a block diagram illustrating an exemplary architecture for supporting hardware abstraction and virtualization for single OS with direct OS-HW data transfers, in accordance with an embodiment of the invention.

FIG. 2B is a block diagram illustrating an exemplary architecture for supporting hardware abstraction and virtualization for single OS with direct OS-HW data transfers, in accordance with an embodiment of the invention. Referring to FIG. 2B, there is shown an exemplary network abstraction based architecture 230, which may support hardware resource abstraction and/or virtualization of single OS in the network device 100. Shown in FIG. 2B, is the hardware resources 202, the abstraction layer 204, the operating system (OS) 206, the plurality of vNIC drivers 210a, ..., 210n, a software partition 238, the physical network driver 222, and the physical storage driver 224.

The software partition 238 may be similar to the software partition 208, substantially as described with regard to FIG. 2B. The software partition 238, however, may only provide configuration servicing to the OS 206, and data transfers between the OS 206 and the hardware resources during network access via the vNIC drivers 206a, ..., 206n may be performed directly, via the abstraction layer 204. Accordingly, the software partition may not comprise the software switching module 220.

In operation, the network abstraction based architecture 230 may be operable to enable providing hardware resource abstraction and/or virtualization of single OS in the network device 100, similar to the network abstraction based architecture 200, substantially as described with regard to FIG. 2A. Some aspects of the operations of the network abstraction based architecture 230, however, may differ. For example, software partition 238 may only be utilized during configuration of the elements of the OS 206 that are utilized during interactions with the hardware resources 202. Because no sharing of hardware resource, such as a physical NIC or HBA, is needed for the single OS case, and no protection against inter-VM attacks is needed, the vNIC Tx/Rx resources may be owned directly by the OS. Only the configuration and/or resource allocation should be done through the software partition 208, via the physical network driver 222 and/or the physical storage driver 224. Accordingly, the slow path 240, comprising only configuration and/or management related traffic, is utilized between the OS 206 and the software partition 238. This may allow abstracting one device to be presented as many to the OS. On the other hand, the fast path 242, comprising data transfers, may be used directly, via the abstraction layer 204, between the OS 206 and the hardware resources 202 once the configuration phase is complete.

In this regard, in instances where the abstraction layer may comprise a hypervisor, the OS 206 may be configured and/or run as if it was a virtual machine. However, some adjustments and/or special configurations may be performed before data transfers are allowed via the abstraction layer 204. For example, in instances where the abstraction layer 204 comprises a hypervisor, the hypervisor functionality may be modified to enable communications between multiple vNIC drivers 206a, ..., 206n and a single physical NIC. For example, during operations of the vNIC drivers 206a, ..., 206n in the network abstraction based architecture 230, the fast path 242 may comprise, per each vNIC driver in the OS 206, a dedicated queue, or a queue pair, with interrupt vector, such as MSIx for example, and a dedicated set of addressing parameters, such as MAC/VLAN addresses. During the data receive stage, the physical NIC in the hardware resources 202 may perform various operations such as, for example, filtering based on MAC/VLAN address; bandwidth control per vNIC; data assignment to each vNIC queue(s). During the transmit stage, each of the vNIC drivers 206a, ..., 206n may directly fetch data and/or post more buffers from and/or to the corresponding queues.

The vNIC drivers 206a, ..., 206n may impose various network access related control parameters, such as bandwidth and/or QoS control and may post data into the queues. The physical NIC may also provide switching services for unicast, multicast, and/or broadcast traffic among the vNICs. In this regard, the physical NIC either sends frames, during switching operation, to the receive path of the target vNICs, or may forward the traffic targeted for switching out, wherein the actual switching may be performed via an external network switch. The slow path 240, on the other hand, may be utilized to enable the software partition to perform various tasks that facilitate use of the fast path 242 for data transfers. For example, the slow path 240 may be used to perform association of each of the vNIC drivers 206a, . . . , 206n with necessary elements of the hardware resources 202, checking hardware resources 202 availability for new vNICs, hot addition and/or removal of vNICs, and/or associated resource allocation and/or removal.

In various embodiments of the invention, the components utilized to facilitate virtualization based access, such as the software partition 208 (or the software partition 238) and hardware abstraction layer 204, may be packaged as A SINGLE entity. In this regard, the hardware abstraction layer 204 may own the hardware resources 202, and must be first to boot during system boot-up operations. The functionality that may be utilized during booting of the hardware resources 202 may be stored, for example, in the BIOS (not shown). For example, where the network abstraction based architecture 230 is utilized with a single physical NIC, the vNIC configuration information in the BIOS may define, for example, memory rendezvous locations to support a plurality of vNIC drivers. In addition, OEM configuration tools may communicate with functionality and/or tools used by hardware abstraction layer 204, unless already integrated. In instances where the vNIC mode may be turned off, code in the hardware abstraction layer 204 may be skipped, and normal BIOS execution mode may be utilized. Else, in instances where the vNIC mode is turned on (i.e., to support virtualization based access to a physical NIC by a single OS), the hardware abstraction layer 204 and the software partition 238 may be activated, and may participate, for example, in enumeration of hardware resources 202 over PCI replicating, for example, PCI devices to the single OS.

The hardware abstraction layer 204 and/or the software partition 208 (or the software partition 238) may be exposed using, for example, additional or different PCI Ds than the one exposed directly by the hardware resources 202. This may allow use of different and/or multiple drivers adapted to network abstraction, rather than being limited to use of the one PCI ID which the physical device exposes; and/or use of a different mode in the OS driver that may be network abstraction aware. In this regard, the used driver may be network abstraction aware, and may be adapted to support data processing and/or control based on network abstraction abased architecture. During use of network abstraction based architectures, such as network abstraction based architecture 200 or network abstraction based architecture 230, unnecessary functionality of the hardware abstraction 204 and/or the software partition 208 (or the software partition 238) may be disabled or removed to provide the OS 206 with the largest physical memory possible. Only necessary functionality may remain available (i.e. "alive") at all times. In this regard, in the network abstraction based architecture 200 the components and/or functionality utilized during data transfers between the OS 206 and the hardware resources 202, for example, may remain alive. In the network abstraction based architecture 230, however, because the vNIC drivers in the OS 206 may communicate directly with the hardware resources 202 using the fast path 242, the functionality utilized during network abstraction based operations may not be required, in memory, as long as, for example, no configuration changes, PCI related changes, and/or new hardware allocations are required or no advanced services (e.g. migration) are needed. Accordingly, only attempts via the OS 206, to access PCI configuration space for example, may force network abstraction based operations and/or functionality to be activated again.

In some embodiments of the invention, network abstraction based architectures, such as the NAS based architecture 200 or the network abstraction based architecture 230, may eliminate the need to use "lock" mechanisms in operation systems when supporting use of a single physical device by a plurality of processes. In this regard, presently when a single physical resource supports concurrent use by a plurality of threads and/or cores in an operating system, the operating system must account for the fact that these multiple processes may attempt to use and/or control that single physical resource at the same time. Various methods may be utilized to guard against undesired conflicts among those processes. For example, the OS may simply support running a single thread or process at any given time, which ensure that only a single thread would be using and/or controlling each physical resource at any given point but would also prohibit enjoying the benefits of multiple cores. Alternatively, however, OS may allow running multiple threads or cores concurrently, and may utilize locks during interactions between each thread and the physical resource to prevent remaining threads from trying to interact with the same resource at the same time. Use of locks may not be efficient since each thread may be granted complete access to and/or control of the resource even though operations performed by the thread may necessitate part of the total capabilities of the resource.

In network abstraction based architectures, however, there may be no need to scale the use of the hardware resources based on the number of threads in the OS because the network abstraction based access may enable representing each hardware resource as plurality of virtual instances such that each virtual instance may be assigned to each thread and may be used, accessed, and/or controlled utilizing the same mechanism and/or functionality used to access the corresponding physical resource. The network abstraction architecture may then be utilized to manage access to the physical resource by allocating to each virtual instance only part of the total capabilities of the physical resource based on the needs and/or limitations of the corresponding threads.

Figure 3:
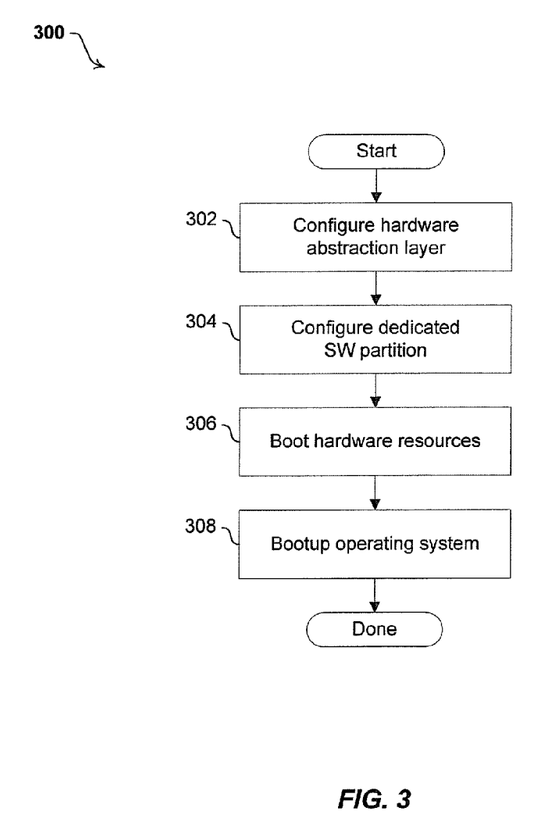
FIG. 3 is a flow chart that illustrates exemplary steps for network abstraction and virtualization for a single OS support, in accordance with an embodiment of the invention.

FIG. 3 is a flow chart that illustrates exemplary steps for network abstraction and virtualization for a single OS support, in accordance with an embodiment of the invention. Referring to FIG. 3, there is shown a flow chart 300 comprising a plurality of exemplary steps that may be performed to enable network abstraction and virtualization for a single operating system (OS).

In step 302, the hardware abstraction layer may be configured. For example, the hardware abstraction layer 204 may be configured in the NAT based architecture 200 or the network abstraction based architecture 230. In step 304, a dedicated software partition, if used, for use in abstraction-based access operations may be configured. For example, the software partition 208 may be configured in the network abstraction based architecture 200, substantially as described with regard to, for example, FIG. 2A. Similarly, the software partition 238 may be configured in the network abstraction based architecture 230, substantially as described with regard to, for example, FIG. 2B. Configuring the software partition 208 (or software partition 238) may comprise, for example, specifying the number of vNIC drivers that may supported, and/or determining networking attributes and/or parameters that may be assigned and/or allocated among the vNIC drivers. The code and/or data utilized during the configuration steps described herein may be stored in, and/or retrieved from, for example, non-volatile memory that is dedicated for abstraction related configuration, and which may be powered on prior to the whole system bootup. Furthermore, while the invention as described herein may disclose the configuration of the software partitions and/or the hardware abstraction layer prior to system boot, the invention need not be so limited. Accordingly, in some embodiments one or more the configuration steps may be performed after the system boot. In step 306, the hardware resources which may be accessed utilizing the hardware abstraction layer may be booted. For example, the hardware resources 202, which may be accessed utilizing the hardware abstraction layer 204, may be booted. In step 308, an operating system, which may utilize abstraction based hardware access operations may be booted. For example, the operating system 206 may be booted, and may access the hardware resources 202 utilizing the hardware abstraction layer 204 and the software partition 208 (or the software partition 238). In this regard, the software partition 208 may be utilized to support multiple vNIC drivers in the operating system 206 that share a single physical NIC in the hardware resources 202, substantially as described with regard to, for example, FIG. 2A.

Various embodiments of the invention may comprise a method and system for network abstraction and virtualization for a single operating system (OS). The network device 100 may be operable to provide access to the hardware resources 202 to the OS 206, which may be running in the network device 100 utilizing network abstraction based architecture 200 and/or the network abstraction based architecture 230. In this regard, the abstraction layer 204 and the software partition (or the software partition 238) may be used to provide NAS based access to the hardware resources 202. The abstraction layer 204 may enable abstracting actual characteristics and/or number of the hardware resources, and may support virtualization of the hardware resources 202. The abstraction layer 204 may comprise a hypervisor, which may be optimized to support abstraction based operations. The software partition 208 and/or the software partition 238 may enable managing use and/or access of the hardware resources 202 by the OS 206 via the abstraction layer 204 utilizing, for example, virtualization based techniques. The hardware resources 202 may comprise networking resources.

The software partition 208 and/or the software partition 238 may support, during management of access to the hardware resources, use and/or operations of a plurality of drivers within the OS 206 corresponding to each of one or more of the hardware resources 202. The OS 206 may support, for example, operations of the plurality of virtual network interface controller (vNIC) drivers 210a, . . . , 210n, which may be correspond to a single physical NIC in the hardware resources 202. In this regard, use of the software partition 208 (or the software partition 238) and/or the abstraction layer 204 may enable variably allocating total network access capabilities of the single physical NIC among the plurality of vNIC drivers 210a, . . . , 210n, wherein the network access capabilities may comprise bandwidth and/or quality of service (QoS) related parameters. The software partition 208 and/or the software partition 238 may support configuring communication and/or data transfers to between the OS 206 and the hardware resources 202 during use of the hardware resources 202 via the software partition 208 (or the software partition 238) and/or the abstraction layer 204. Data transfers between the OS 206 and the hardware resources 202 may be performed directly. Alternatively, at least some of the data transfer may be performed indirectly, via the software partition 208 in the network abstraction based architecture 200. At least some of functionality of the abstraction layer 204, which may be used during full virtualization of the network device 100 supporting running a plurality of virtual machines (VMs) concurrently in the network device 100, may be disabled when only the OS 206 is running.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for network abstraction and virtualization for a single operating system (OS).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for abstraction processing, the method comprising:
    configuring an abstraction layer of a hardware resource to abstract capabilities of the hardware resource;
    spawning a plurality of virtual interfaces, each virtual interface being independently operable as an interface of an operating system; and
    managing, by one or more circuits, one or more processors, or any combination thereof, unicast, multicast, and broadcast data transfer among the plurality of virtual interfaces and between the hardware resource and the plurality of virtual interfaces, based on a control parameter of at least one of the hardware resource or the plurality of virtual interfaces.

2. The method according to claim 1, further comprising:
specifying, by a network capability parameter of the plurality of virtual interfaces, networking capabilities allocated to each of the plurality of virtual interfaces; and
managing overall use of the hardware resource among the plurality of virtual interfaces according to the networking capabilities allocated to each of the plurality of virtual interfaces.

3. The method according to claim 2, wherein specifying the networking capabilities comprises specifying at least one of data transfer addressing information, a data transfer bitrate, a data transfer quality of service (QoS), or a data transfer bandwidth of at least one of the plurality of virtual interfaces.

4. The method according to claim 1, further comprising configuring the abstraction layer to present a peripheral interconnect function of the hardware resource as multiple peripheral interconnect functions.

5. The method according to claim 1, wherein:
the hardware resource comprises a single physical device; and
the abstraction layer enables the plurality of virtual interfaces to operate in the operating system and interface with the single physical device.

6. The method according to claim 1, wherein:
the plurality of virtual interfaces comprise a plurality of virtual network interface controller (vNIC) drivers of the operating system; and
the hardware resource comprises a single physical network interface controller (NIC).

7. The method according to claim 6, further comprising:
managing allocation of networking attributes among the plurality of vNIC drivers, wherein
the networking attributes comprise at least one of virtual local area network (VLAN) addressing information, bandwidth, or data transfer quality of service (QoS).

8. The method according to claim 7, wherein the managing allocation of networking attributes comprises managing allocation of networking attributes variably or independently among the plurality of vNIC drivers.

9. The method according to claim 1, further comprising disabling, when a single operating system is executed by the processor, at least some functionality of the abstraction layer that is used during virtualization of a plurality of virtual machines.

10. A system for abstraction processing, the system comprising:
a network device comprising a host subsystem and a networking subsystem, the networking subsystem being adapted to:
spawn a plurality of virtual interfaces, each virtual interface being independently operable as an interface of an operating system; and
manage unicast, multicast, and broadcast data transfer among the plurality of virtual interfaces based on a control parameter of the plurality of virtual interfaces; and
the host subsystem being adapted to:
configure an abstraction layer of a hardware resource of the networking subsystem to abstract capabilities of the hardware resource; and
manage unicast, multicast, and broadcast data transfer between the hardware resource and the plurality of virtual interfaces based on a control parameter of the hardware resource.

11. The system according to claim 10, wherein the host subsystem is further adapted to:
specify, by the control parameter of the plurality of virtual interfaces, networking capabilities allocated to each of the plurality of virtual interfaces; and
manage overall use of the hardware resource among the plurality of virtual interfaces according to the networking capabilities allocated to each of the plurality of virtual interfaces.

12. The system according to claim 11, wherein the host subsystem is further adapted to specify at least one of data transfer addressing information, a data transfer bitrate, a data transfer quality of service (QoS), or a data transfer bandwidth of at least one of the plurality of virtual interfaces.

13. The system according to claim 10, wherein the host subsystem is further adapted to configure the abstraction layer to present a peripheral interconnect function of the hardware resource as multiple peripheral interconnect functions.

14. The system according to claim 10, wherein the host subsystem is further adapted to configure the control parameter of the plurality of virtual interfaces to provide at least one of unicast, multicast, or broadcast based switching among the plurality of virtual interfaces.

15. The system according to claim 10, wherein:
the hardware resource comprises a single physical device; and
the abstraction layer enables the plurality of virtual interfaces to operate in the operating system and interface with the single physical device.

16. The system according to claim 10, wherein:
the plurality of virtual interfaces comprise a plurality of virtual network interface controller (vNIC) drivers of the operating system; and
the hardware resource comprises a single physical network interface controller (NIC).

17. The system according to claim 16, wherein:
the host subsystem is further adapted to manage allocation of networking attributes among the plurality of vNIC drivers; and
the networking attributes comprise at least one of virtual local area network (VLAN) addressing information, bandwidth, or data transfer quality of service (QoS).

18. The system according to claim 17, wherein the host subsystem is further adapted to manage allocation of networking attributes variably or independently among the plurality of vNIC drivers.

19. The system according to claim 10, wherein the host subsystem is further adapted to disable, when a single operating system is executed by a processor of the host subsystem, at least some functionality of the abstraction layer that is used during virtualization of a plurality of virtual machines.

20. A method for abstraction processing, comprising:
abstracting capabilities of a hardware resource;
spawning a plurality of virtual interfaces, each virtual interface being independently operable as an interface of an operating system;
specifying networking capabilities allocated to the hardware resource and the plurality of virtual interfaces; and
managing, by one or more circuits, one or more processors, or any combination thereof, unicast, multicast, and broadcast data transfer among the plurality of virtual interfaces and between the hardware resource and the plurality of virtual interfaces, based on the specified networking capabilities allocated to the hardware resource and the plurality of virtual interfaces.

21. The method according to claim 20, wherein specifying the networking capabilities comprises specifying at least one of data transfer addressing information, a data transfer bitrate, a data transfer quality of service (QoS), or a data transfer bandwidth of at least one of the plurality of virtual interfaces.

22. The method according to claim 20, wherein:
the hardware resource comprises a single physical device, and
an abstraction layer enables the plurality of virtual interfaces to operate in the operating system and interface with the single physical device.

23. The method according to claim 20, further comprising validating one or more media access control (MAC), virtual local area network (VLAN), or internet protocol (IP) fields in a packet by comparing the one or more MAC, VLAN, or IP fields with attributes of the plurality of virtual interfaces.

24. The method according to claim 20, further comprising isolating the plurality of virtual interfaces to maintain stability between the plurality of virtual interfaces using double memory page table accounting.

* * * * *